Dec. 15, 1953
T. R. ROBERTS
2,662,425
SAW FILING DEVICE
Filed July 12, 1951
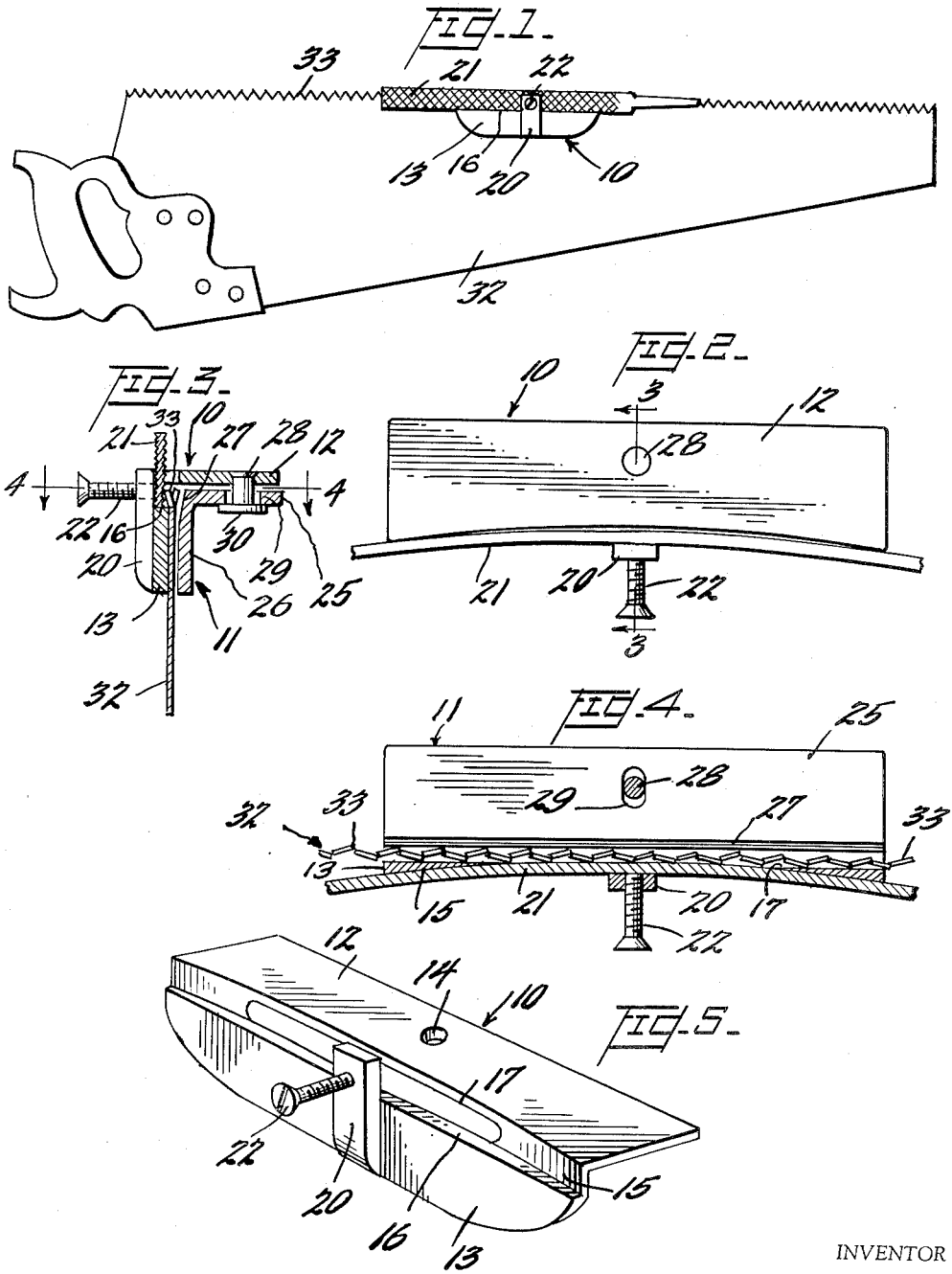
INVENTOR
T. R. Roberts,
BY Parker and Walsh.
ATTORNEY

Patented Dec. 15, 1953

2,662,425

UNITED STATES PATENT OFFICE 2,662,425

SAW FILING DEVICE

Tom R. Roberts, Homestead, Fla.

Application July 12, 1951, Serial No. 236,374

10 Claims. (Cl. 76—47)

This invention relates to a saw filing device, and more particularly to a device for filing the sides of saw teeth after they have been set.

It is the common practice to set the teeth of a saw by bending alternate teeth in opposite directions to provide a cut somewhat wider than the body of the saw to prevent the latter from binding. It is important that the set provided in the teeth be the same at opposite sides of the saw and that all of the teeth at each side of the saw project the same distance laterally from the body of the saw. When a saw is evenly set, a mechanic may saw straight down through a piece of material without any difficulty, whereas an unevenly set saw tends slowly to curve to the right or left as it cuts through the material which occurs when there is more set in the teeth at one side of the saw than in the other.

An important object of the present invention is to provide a novel, simple and easily used device for correcting inaccuracies in the set of the teeth at each side of the saw, and to correct the set of the teeth at one side of the saw to render such teeth uniformly set with respect to the teeth at the other side.

A further object is to provide such a device which readily may be held by the operator in one hand and moved back and forth over the teeth of a saw for the purpose stated.

A further object is to provide such a device with which an ordinary file may be used and wherein the "bite" may be readily adjusted in accordance with the flexing of the file by the adjusting means.

A further object is to provide such a device wherein successive portions of the saw blade are received wholly within the device with a portion of the device extending over a substantial number of the teeth to afford maximum protection to the operator against injury from the teeth of the saw while performing the sharpening operation.

Other objects and advantages of the present invention will become apparent during the course of the following description.

In the drawing, I have shown one embodiment of the invention. In this showing,

Figure 1 is a side elevation of the device shown in operative position on a saw, a conventional file being shown in position on the device, Figure 2 is an enlarged plan view of the device, Figure 3 is a transverse sectional view on line 3—3 of Figure 2, Figure 4 is a horizontal sectional view on line 4—4 of Figure 3, and Figure 5 is a perspective view of one of the body elements of the device with the file omitted.

Referring to Figures 3 and 5, the numerals 10 and 11 respectively indicate the main body members of the device. The body member 10 is of angle iron section and comprises a horizontal flange 12 and a vertical flange 13. The horizontal flange 12 is provided with an opening 14 for a purpose to be described. The vertical flange 13 has its upper portion cut away as at 15 to form a shoulder 16, and the cut-away portion 15 is slightly concave from end to end as shown in Figure 4. The concavity of the cut-away portion is of sufficient depth to cut entirely through the flange 13 to form an elongated opening 17 for a purpose to be described.

A lug 20 is welded or otherwise secured against the lower face portion of the flange 13 and projects upwardly so that its upper end is substantially flush with the top face of the flange 12. The shoulder 16 is adapted to support a conventional file 21 and the upper portion of the lug 20 carries an adjusting screw 22 which, when tightened, will flex the file 21 to project it through the opening 17 as shown in Figure 4.

The body member 11 also is of angle section and comprises a horizontal flange 25 and a depending vertical flange 26. The face of the latter flange toward the flange 13 is tapered at its upper end as at 27. A rivet 28 connects the flanges 12 and 25. This rivet extends through the opening 14 and through an opening 29 in the flange 25, this opening being slightly elongated transversely of the body member 11 for free limited movement of the flange 26 toward the flange 13 for a purpose to be described. The rivet 28 may be headed at its lower end as at 30.

The device may be used for evening the set of numerous types of saws. A conventional saw 32 is shown in Figures 1, 3 and 4, and this saw is provided with teeth 33 shown as being set in accordance with conventional practice.

Operation

The present device may be used either for "joining" the saw teeth or for evening the set thereof. The operation of joining the teeth consists in evening the ends of the teeth, as is well known. With the file 21 clamped in position, as shown in Figure 3, the saw may be joined by placing the blade flat on top of the flange 12 with the teeth 33 adjacent the file 21. The device then may be moved back and forth to file the ends of the teeth so that such ends will lie in alignment.

Assuming that the saw has been set and it is desired to even the setting of the teeth, the operator will slide the present device over the saw blade as shown in Figure 3. The body member 11 is movable within the limits of the slot 29 away from the flange 13, and the space thus provided between the flanges 13 and 26 permits the saw blade to be inserted in position either vertically as viewed in Figure 3 or endwise of the saw blade. The operator may grasp the device by placing his thumb over the outside of the flange 13, arching his hand over the device, and placing the ends of one or more of the fingers against the right hand face of the flange 26. Gripping the two body members in this manner moves these members toward each other into sliding engagement with the saw blade. The taper 27 provides clearance for the teeth 33 which are inclined away from the file, while the opposite teeth will be engaged with the file.

The operator will move the device back and forth endwise of the saw, progressively moving the device along the saw from time to time. In this way, any teeth at the left hand side of the saw in Figure 3 which have their corners projecting beyond adjacent teeth will be cut down to provide an even set.

After evening one side of the teeth, the device will be removed from the saw and reversed to even the teeth at the opposite side of the saw. The device is removed and thus reversed without disturbing the file 21, which is held clamped in position by the adjusting screw 22. This screw obviously may be tightened or loosened to adjust the "bite" of the file against the saw teeth. A number of saws may have the teeth thereof evened with one setting of a conventional file.

When the file becomes somewhat dulled by substantial use, the set screw 22 may be loosened and the file moved endwise a short distance. A single file may be used over a long period of time since obviously after one side of the file has been used substantially from end to end adjacent one edge thereof, the file may be turned end for end in its own plane to use the opposite edge portion of the same side. The file then may be reversed, side for side, and similarly used and adjusted as to its positions. The file is readily insertable in position merely by backing out the screw 22, placing the file in position, and tightening the screw to the extent desired. The shoulder 16 supports the file and accordingly the latter cannot swing out of position even though it is flexed by the single point engagement of the screw 22.

The connection of the two body parts by the rivet or similar element 28 makes the entire device self-contained except for the file, and accordingly, the parts are always together and always ready for use. As a matter of fact, once the file has been placed in a given position, it may remain in such position for substantial periods of time to become in effect part of the entire unit.

The device is simple in construction and quite compact, and the use of the device for its intended purpose is quite easily carried out. The operation is so easy that a mechanic may hold the saw in one hand while working the present device with the other hand. It will be apparent, however, that if desired the saw blade readily may be clamped in a vise while the present device is being used.

I claim:

1. In a saw evening device, a pair of elongated complementary members having spaced parallel walls between which the toothed edge of a saw is adapted to be arranged, one of said walls being provided with an elongated opening therethrough opposite which the toothed edge of a saw is adapted to be disposed when positioned between said walls, and means for clamping a file against the outer surface of said last-named wall in such manner that the file is flexed to extend through said opening into contact with the sides of the teeth of the saw.

2. In a saw evening device, a pair of elongated complementary members having spaced parallel walls between which the toothed edge of a saw is adapted to be arranged, one of said walls being provided with an elongated opening therethrough opposite which the toothed edge of a saw is adapted to be disposed when positioned between said walls, said last-named wall being provided with a longitudinal shoulder lying beneath said opening to support a file of such length as to extend beyond the ends of said opening in engagement with the outer face of said wall, and means engageable with the portion of said file intermediate the ends of said opening for flexing such portion of the file through said opening into engagement with the sides of the teeth of the saw.

3. In a saw evening device, a pair of complementary members having spaced parallel walls between which the toothed edge of a saw is adapted to be arranged, one of said walls being provided with an elongated opening, a lug carried by the outer face of said last-named wall and having a portion thereof disposed opposite and in spaced relation to said opening and a screw threaded through said portion of the lug opposite and intermediate the ends of said opening to engage a file lying between said screw and said last-named wall to flex the central portion of the file through said opening into engagement with the teeth of the saw.

4. In a saw evening device, a pair of elongated body members having parallel walls spaced from each other to receive the toothed end of a saw therebetween, means connecting said body members to each other for limited relative movement of said walls toward and away from each other for the insertion of a saw blade therebetween, one of said walls being provided with an elongated opening parallel to the edge of the saw, a screw mounted on said last-named wall transversely thereof and engageable with the outer face of a file lying over said opening centrally of the length of said file whereby tightening of said screw will force the central portion of said file to flex through said opening to engage the sides of the teeth of the saw.

5. In a saw evening device, a pair of elongated body members having parallel walls spaced from each other to receive the toothed end of a saw therebetween, means connecting said body members to each other for limited relative movement of said walls toward and away from each other for the insertion of a saw blade therebetween, one of said walls being provided with an elongated opening parallel to the edge of the saw, the outer face of said wall being provided with a longitudinally extending shoulder to support thereon a file lying opposite said opening and extending beyond the ends thereof in engagement with said wall, a lug carried by said wall outwardly of said file, and a screw threaded through said lug and engaging said file substantially centrally of the length of said opening whereby, upon tightening of said screw, said file will be caused to flex through said opening to engage the teeth of the saw.

6. In a saw evening device, a pair of elongated body members of angle section, said members having adjusting flanges at the top of the device parallel to each other and depending working flanges parallel to each other, a pin carried by one of said adjusting flanges, the other of such flanges having a slot receiving said pin to provide for limited movement of said working flanges toward and away from each other, said working flanges being adapted for the insertion therebetween of the toothed edge of a saw, one of said working flanges being provided with an opening elongated parallel to the toothed edge of the saw, and means engageable with a file lying lengthwise of said opening and intermediate the length of such file to force the central portion thereof to flex through said opening into engagement with the teeth of the saw.

7. In a saw evening device, a pair of elongated body members of angle section, said members having adjusting flanges at the top of the device parallel to each other and depending working flanges parallel to each other, a pin carried by one of said adjusting flanges, the other of such flanges having a slot receiving said pin to provide for limited movement of said working flanges toward and away from each other, said working flanges being adapted for the insertion therebetween of the toothed edge of a saw, one of said working flanges being provided with an opening elongated parallel to the toothed edge of the saw, said last-named working flange having a longitudinal shoulder parallel to and arranged below said opening to support a file arranged against said last-named wall and extending beyond the ends of said opening to bear against the adjacent face of said last-named wall, a lug carried by said last-named wall, and a screw threaded through said lug and engageable with the outer face of said file substantially centrally of the length of said opening whereby, when said screw is tightened, the central portion of said file will be flexed through said opening to engage the teeth of the saw.

8. A saw evening device comprising a pair of elongated body members having walls arranged adjacent and parallel to each other and supported with respect to each other for limited movement toward and away from each other and adapted for the reception therebetween of the toothed edge of a saw, the outer face of one of said walls being provided with a shoulder extending longitudinally thereof, said last-named wall being provided between said shoulder and the edge of said last-named wall adjacent the toothed edge of the saw with a longitudinally extending opening, a file having its edge contacting with said shoulder and engaging the outer face of said last-named wall, said file having its ends extending beyond the ends of said opening to bear against the outer face of said last-named wall, and means for exerting pressure against said file intermediate the length of said opening to flex said file whereby the central portion thereof will extend through said opening into engagement with the teeth of the saw.

9. A saw evening device comprising a pair of elongated body members having walls arranged adjacent and parallel to each other and supported with respect to each other for limited movement toward and away from each other and adapted for the reception therebetween of the toothed edge of a saw, the outer face of one of said walls being provided with a shoulder extending longitudinally thereof, said last-named wall being provided between said shoulder and the edge of said last-named wall adjacent the toothed edge of the saw with a longitudinally extending opening, a file having its edge contacting with said shoulder and engaging the outer face of said last-named wall, said file having its ends extending beyond the ends of said opening to bear against the outer face of said last-named wall, a lug carried by the outer face of said last-named wall and extending upwardly to overlie said opening, and a screw threaded through the end of said lug and engageable with said file centrally of the length of said opening whereby, upon the tightening of said screw, said file will be caused to flex through said opening to engage the sides of the teeth of the saw.

10. A saw evening device comprising a pair of elongated body members of angle section lying one within the other, said members comprising parallel adjusting flanges and parallel working flanges perpendicular thereto, a pin carried by one of said adjusting flanges, the other adjusting flange having a slot receiving said pin to connect said body members together for limited movement of said working flanges toward and away from each other, one of said working flanges being provided with an elongated opening parallel to the corner of the corresponding body member and being further provided with a longitudinally extending shoulder parallel to said opening, a file supported on its edge on said shoulder opposite said opening and extending beyond the ends thereof, and a screw carried by said last-named working flange and engaging said file intermediate the ends of said opening whereby, upon the tightening of said screw, the central portion of said file will be flexed through said opening into engagement with the sides of the teeth of the saw.

TOM R. ROBERTS.

References Cited in the file of this patent

UNITED STATES PATENTS

| Number | Name | Date |
|---|---|---|
| 1,009,613 | Woolf | Nov. 21, 1911 |
| 1,079,232 | Gagnon | Nov. 18, 1913 |
| 2,582,101 | Brown | Jan. 8, 1952 |

FOREIGN PATENTS

| Number | Country | Date |
|---|---|---|
| 46,035 | Sweden | Sept. 27, 1917 |